(12) United States Patent
Gonzalez

(10) Patent No.: US 11,904,922 B1
(45) Date of Patent: Feb. 20, 2024

(54) PAINT CART

(71) Applicant: Angel Gonzalez, Apopka, FL (US)

(72) Inventor: Angel Gonzalez, Apopka, FL (US)

( * ) Notice: Subject to any disclaimer, the term of this patent is extended or adjusted under 35 U.S.C. 154(b) by 0 days.

(21) Appl. No.: 17/943,315

(22) Filed: Sep. 13, 2022

(51) Int. Cl.
*B62B 3/10* (2006.01)
*B62B 3/02* (2006.01)

(52) U.S. Cl.
CPC .............. *B62B 3/104* (2013.01); *B62B 3/02* (2013.01); *B62B 2202/48* (2013.01)

(58) Field of Classification Search
CPC .. B62B 3/104; B62B 3/02; B62B 3/10; B62B 3/00; B62B 2202/48; B62B 2202/02; B62B 2202/028
See application file for complete search history.

(56) References Cited

U.S. PATENT DOCUMENTS

| | | | | |
|---|---|---|---|---|
| 4,993,726 A * | 2/1991 | Schumacher | ............ | B44D 3/14 280/47.35 |
| 5,002,293 A * | 3/1991 | Gottselig | ................ | B62B 3/02 280/47.35 |
| 5,141,211 A * | 8/1992 | Adams, Jr. | ............. | B60C 25/04 269/69 |
| 5,190,303 A * | 3/1993 | Schumacher | ............ | B44D 3/00 108/14 |
| 5,460,391 A * | 10/1995 | Gantz | ...................... | B25H 3/06 108/14 |
| 5,509,672 A * | 4/1996 | Offerson | .................. | B44D 3/00 280/47.35 |
| 6,027,128 A * | 2/2000 | Stich | ................... | B60B 33/0002 280/47.35 |
| 6,695,325 B2 * | 2/2004 | Carrillo | ................... | B62B 3/008 280/79.5 |
| 8,328,173 B1 * | 12/2012 | DesForge | ................. | B62B 3/04 248/176.1 |
| 9,393,979 B1 * | 7/2016 | Milton | ...................... | B62B 3/02 |
| 11,834,086 B2 * | 12/2023 | Lindsey | .................. | B62B 3/005 |
| 2006/0066064 A1 * | 3/2006 | Hardy | ...................... | B44D 3/14 280/79.2 |
| 2007/0210545 A1 * | 9/2007 | Klotz | ...................... | B62B 3/002 280/47.35 |
| 2009/0302563 A1 * | 12/2009 | Thibault | ................. | B62B 3/104 280/727 |
| 2020/0324800 A1 * | 10/2020 | Gonzalez | ............... | B62B 3/025 |

* cited by examiner

*Primary Examiner* — James M Dolak
(74) *Attorney, Agent, or Firm* — Kyle A. Fletcher, Esq.

(57) ABSTRACT

The paint cart is a cart. The paint cart is adapted for use with painting equipment and supplies. The paint cart stores the painting equipment and supplies. The paint cart transports the painting equipment and supplies over a supporting surface. The paint cart comprises a pedestal pan, a plurality of tool pans, and a stanchion structure. The stanchion structure elevates each individual tool pan selected from the plurality of tool pans above the pedestal pan.

15 Claims, 5 Drawing Sheets

PAINT CART

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of hand carts having more than one axis carrying transport wheels that specially adapted to objects of cylindrical shape.

SUMMARY OF INVENTION

The paint cart is a cart. The paint cart is adapted for use with painting equipment and supplies. The paint cart stores the painting equipment and supplies. The paint cart transports the painting equipment and supplies over a supporting surface. The paint cart comprises a pedestal pan, a plurality of tool pans, and a stanchion structure. The stanchion structure elevates each individual tool pan selected from the plurality of tool pans above the pedestal pan.

These together with additional objects, features and advantages of the paint cart will be readily apparent to those of ordinary skill in the art upon reading the following detailed description of the presently preferred, but nonetheless illustrative, embodiments when taken in conjunction with the accompanying drawings.

In this respect, before explaining the current embodiments of the paint cart in detail, it is to be understood that the paint cart is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the paint cart.

It is therefore important that the claims be regarded as including such equivalent construction insofar as they do not depart from the spirit and scope of the paint cart. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
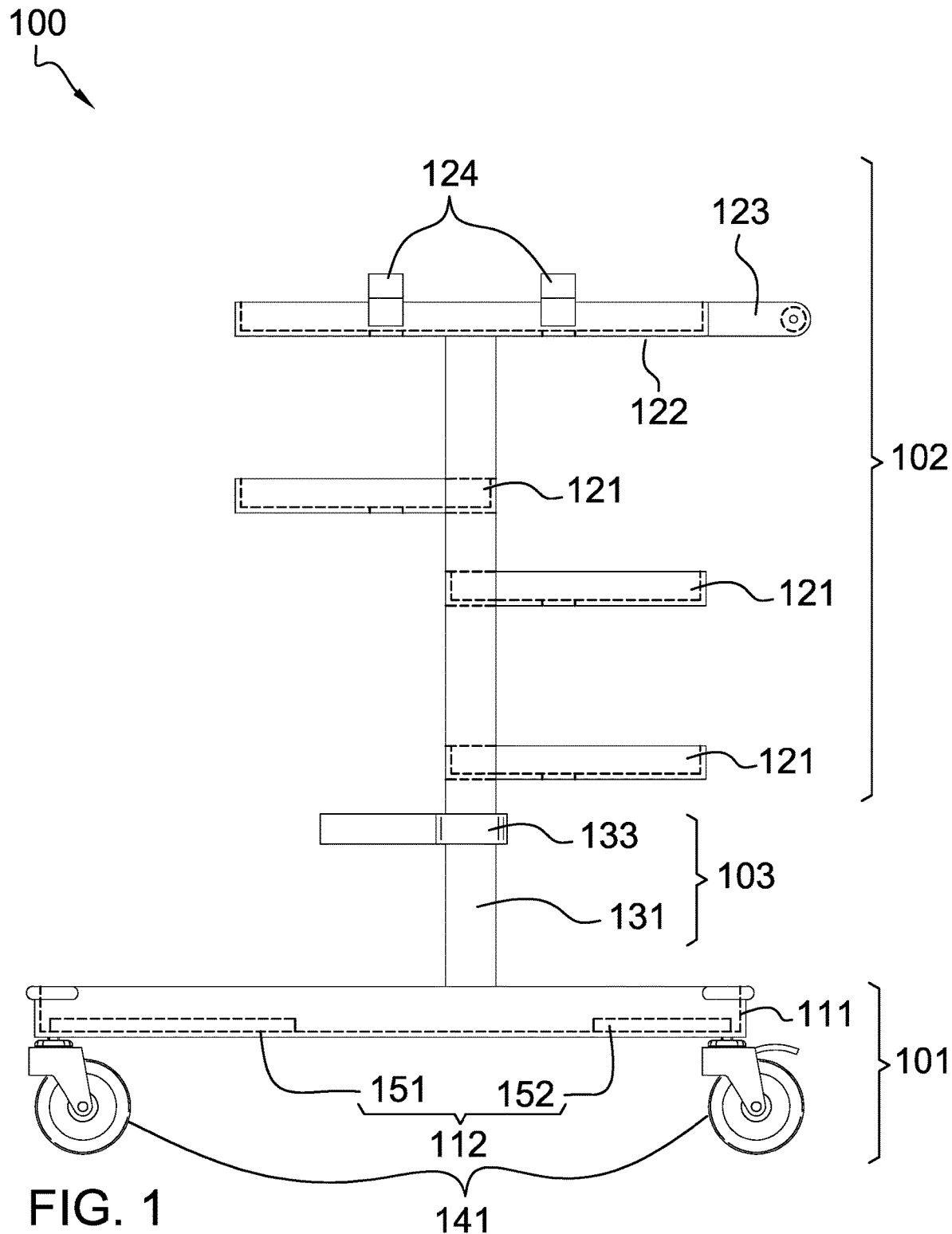
FIG. 1 is a side view of an embodiment of the disclosure.
Figure 2:
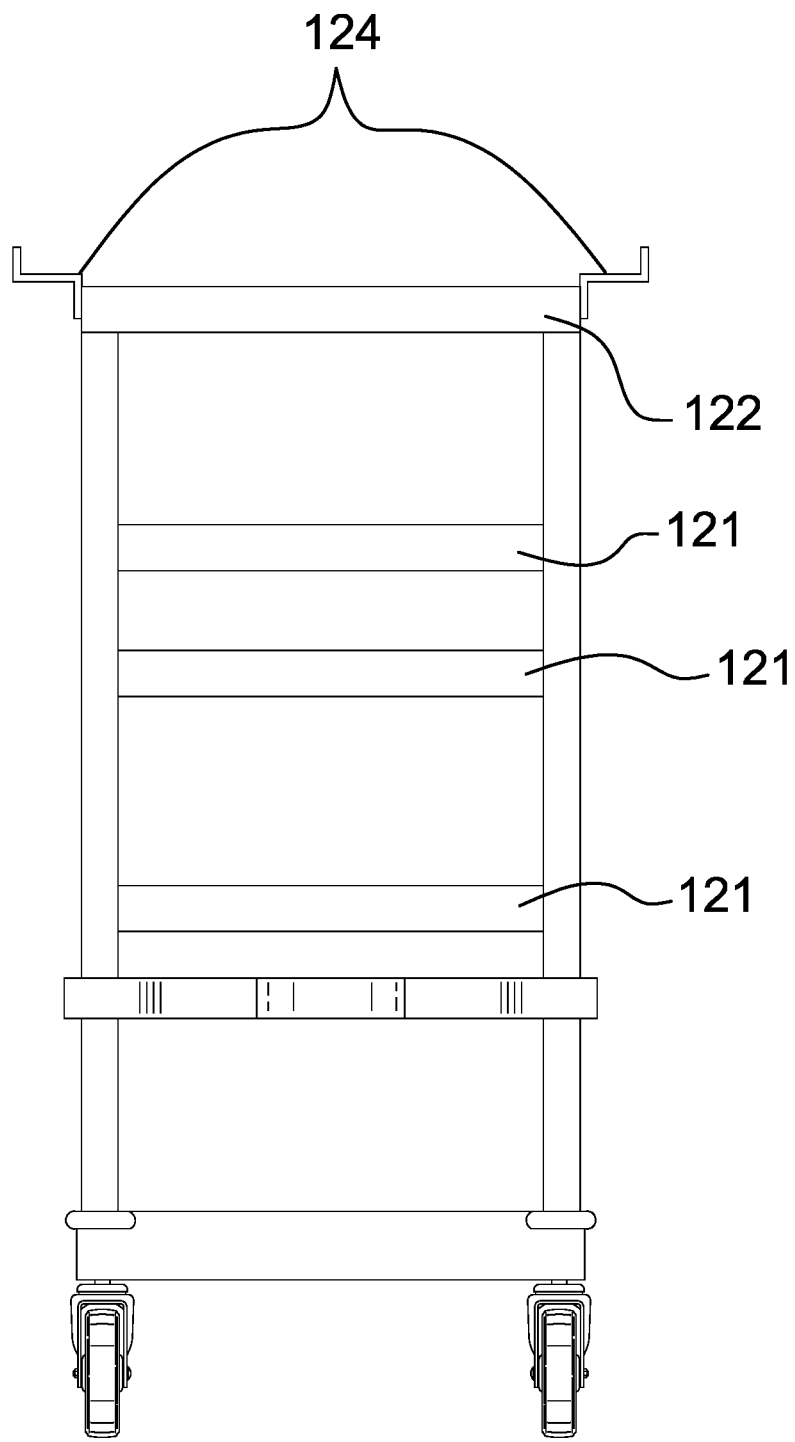
FIG. 2 is a reverse view of an embodiment of the disclosure.
Figure 3:
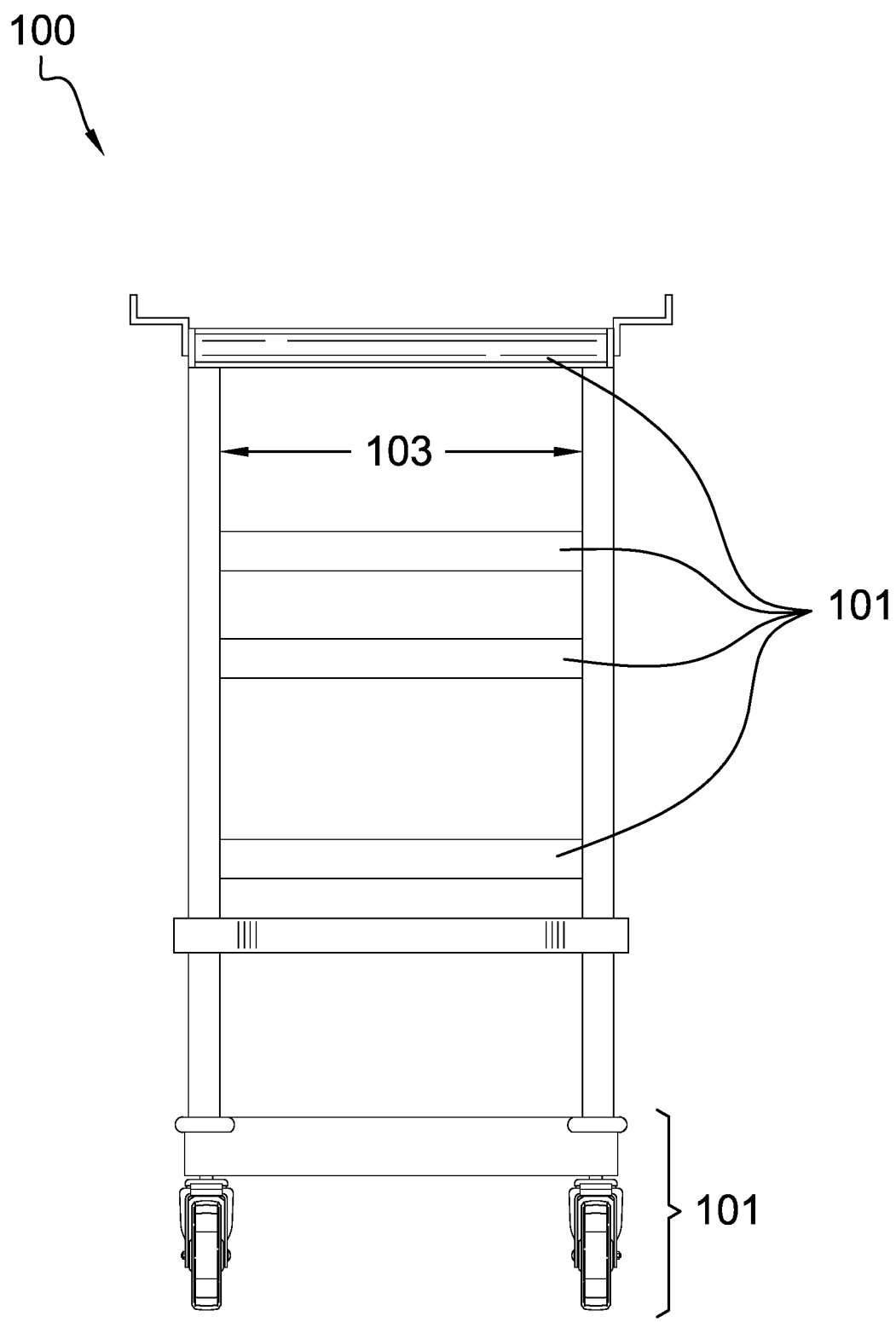
FIG. 3 is a front view of an embodiment of the disclosure.
Figure 4:
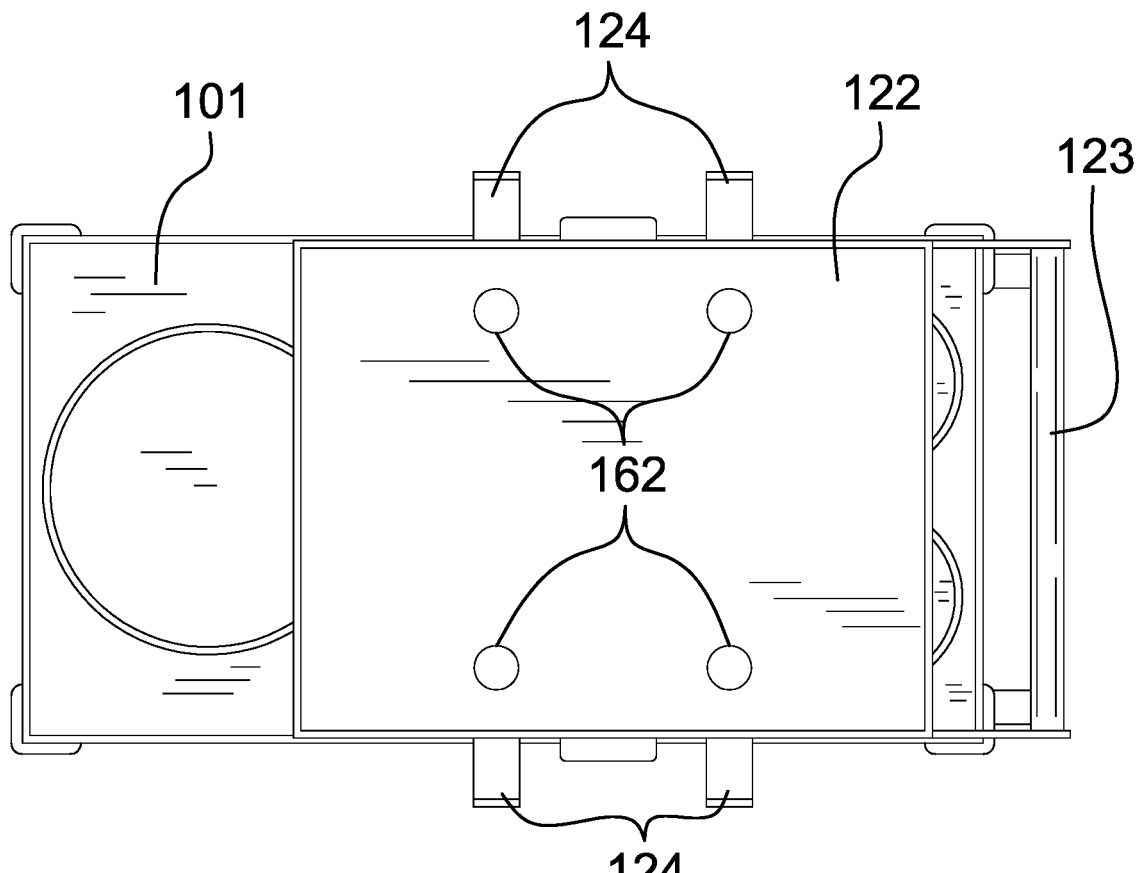
FIG. 4 is a top view of an embodiment of the disclosure.
Figure 5:
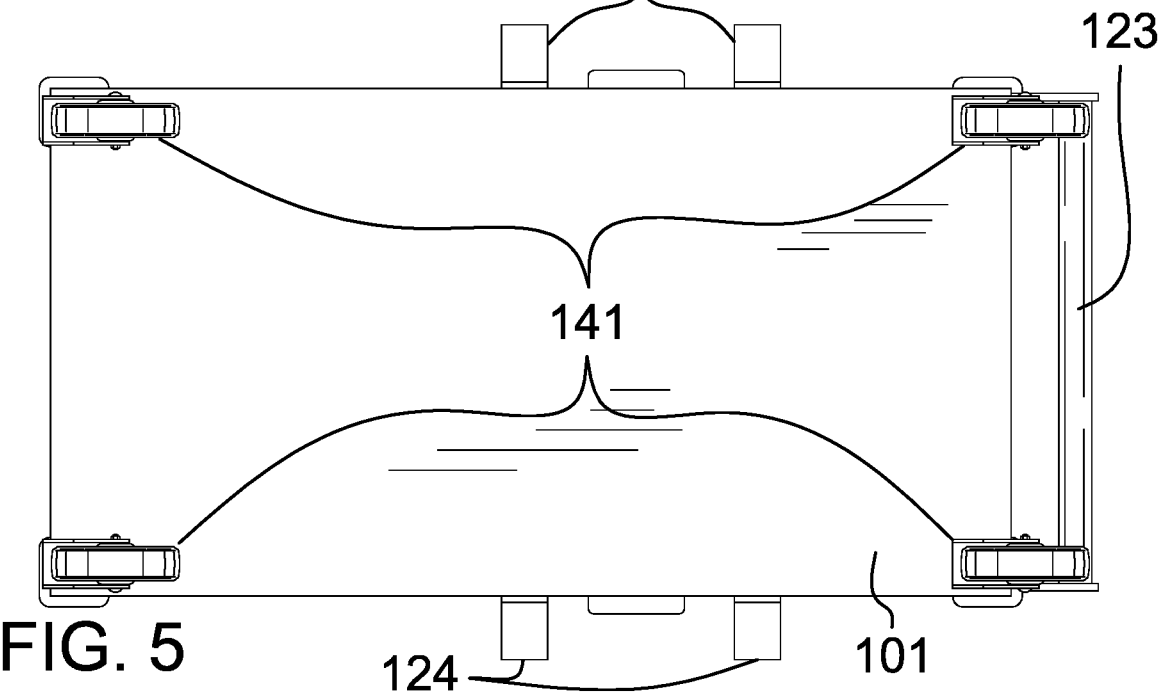
FIG. 5 is a bottom view of an embodiment of the disclosure.
Figure 6:
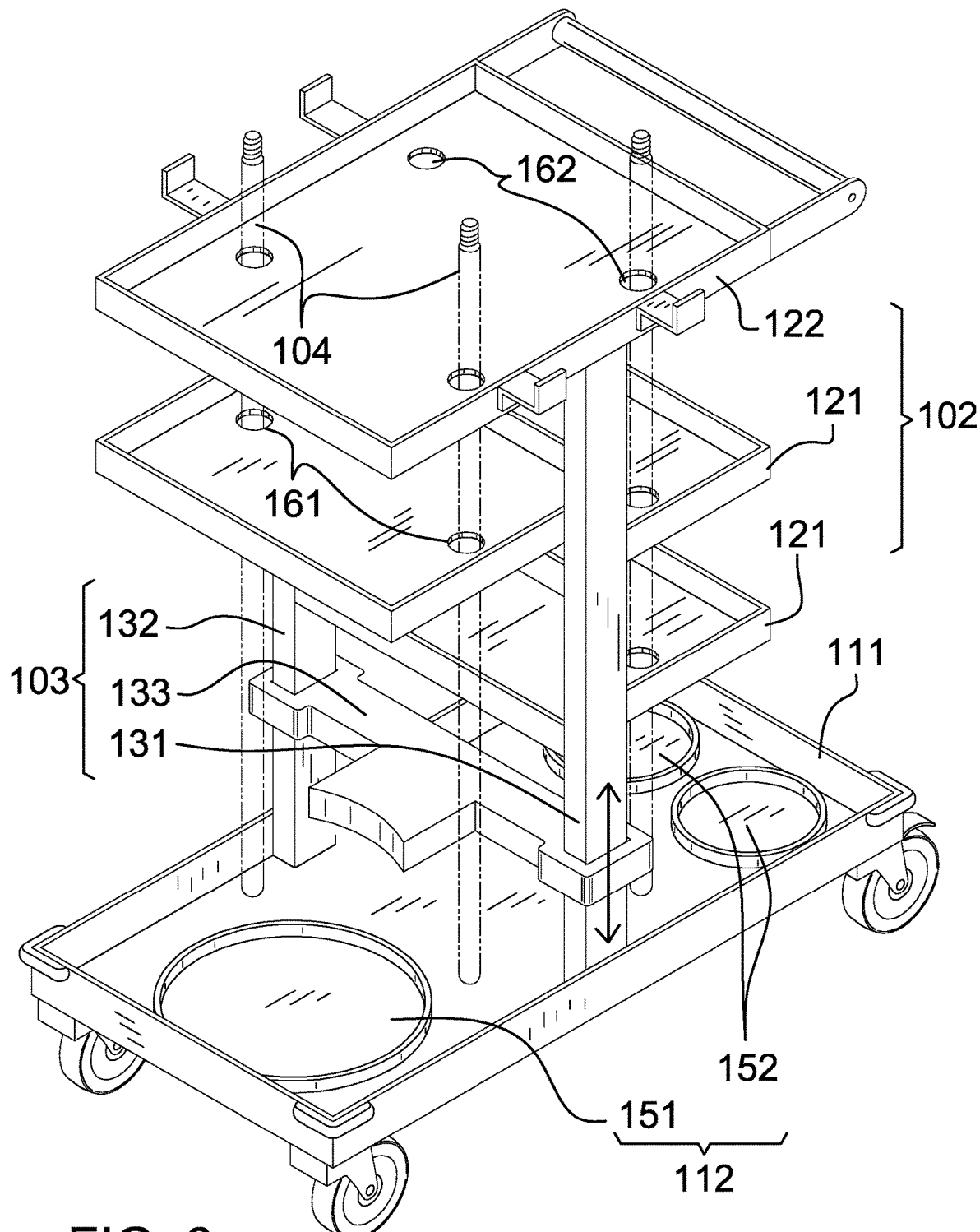
FIG. 6 is a perspective view of an embodiment of the disclosure.

Detailed reference will now be made to one or more potential embodiments of the disclosure, which are illustrated in FIGS. 1 through 6.

The paint cart 100 (hereinafter invention) is a cart. The invention 100 is adapted for use with painting equipment and supplies. The invention 100 stores the painting equipment and supplies. The invention 100 transports the painting equipment and supplies over a supporting surface. The invention 100 comprises a pedestal pan 101, a plurality of tool pans 102, and a stanchion structure 103. The stanchion structure 103 elevates each individual tool pan 121 selected from the plurality of tool pans 102 above the pedestal pan 101.

The pedestal pan 101 is a prism shaped structure. The pedestal pan 101 is a disk shaped structure. The congruent ends of the disk shaped structure of the pedestal pan 101 are horizontally oriented. The pedestal pan 101 has a pan shape. The pedestal pan 101 forms the inferior structure of the invention 100. The pedestal pan 101 is a load bearing structure. The pedestal pan 101 transfers the load of the stanchion structure 103 to a supporting surface. The pedestal pan 101 contains the stocks of paint required for the painting process. The pedestal pan 101 comprises a primary pan 111 and a plurality of anchor pans 112.

The primary pan 111 is a prism shaped structure. The primary pan 111 is a disk shaped structure. The congruent ends of the disk shaped structure of the primary pan 111 are horizontally oriented. The primary pan 111 has a pan shape. The closed face of the pan structure of the primary pan 111 forms the inferior surface of the pan shape of the primary pan 111. The primary pan 111 forms the primary shape of the pedestal pan 101. The stanchion structure 103 attaches to the primary pan 111. The primary pan 111 is a load bearing structure. The primary pan 111 transfers the load of the stanchion structure 103 to the plurality of casters 141. The primary pan 111 forms the structure that stores the paint used in the painting process. The primary pan 111 further comprises a plurality of casters 141.

The plurality of casters 141 forms the inferior structure of the invention 100. The plurality of casters 141 transfers the load borne by the primary pan 111 to the supporting surface. The plurality of casters 141 attaches to the inferior surface of the closed face of the pan structure of the primary pan 111. Each caster selected from the plurality of casters 141 is a rolling structure. Each selected caster transfers a portion of the load of the primary pan 111 to the supporting surface. The plurality of casters 141 rolls the invention 100 over the supporting surface.

Each anchor pan selected from the plurality of anchor pans 112 is a prism shaped structure. Each anchor pan selected from the plurality of anchor pans 112 is a disk shaped structure. The congruent ends of the disk shaped structure of each anchor pan selected from the plurality of anchor pans 112 are horizontally oriented. Each anchor pan selected from the plurality of anchor pans 112 has a pan shape. The closed face of each selected anchor pan is formed by the closed face of the pan structure of the primary pan 111. Each selected anchor pan is geometrically similar to a can of paint. Each selected anchor pan is sized such that the can of paint inserts into the selected anchor pan for storage. Each selected anchor pan stores the can of paint during transport. Each selected anchor pan prevents the can of paint from shifting during transport.

The plurality of anchor pans 112 further comprises a five gallon paint pan 151 and a plurality of one gallon paint pans 152.

The five gallon paint pan 151 is a pan that is formed on the superior surface of the closed face of the primary pan 111. The five gallon paint pan 151 is geometrically similar to the five gallon paint can. The five gallon paint pan 151 is sized such that the five gallon paint can fits in the five gallon paint pan 151. The five gallon paint pan 151 anchors the five gallon can to the primary pan 111 while the invention 100 is in motion.

Each one gallon paint pan selected from the plurality of one gallon paint pans 152 is a pan that is formed on the superior surface of the closed face of the primary pan 111. The plurality of one gallon paint pans 152 is geometrically similar to a one gallon paint can. The plurality of one gallon paint pans 152 is sized such that the one gallon paint can fits in the plurality of one gallon paint pans 152. The plurality of one gallon paint pans 152 anchors the one gallon can to the primary pan 111 while the invention 100 is in motion.

The plurality of tool pans 102 comprises a collection of individual tool pans 121. Each individual tool pan 121 selected from the plurality of tool pans 102 is a prism shaped structure. Each selected individual tool pan 121 is a disk shaped structure. The congruent ends of the disk shaped structure of each selected individual tool pan 121 are horizontally oriented. Each selected individual tool pan 121 has a pan shape. Each selected individual tool pan 121 contains the tools required for the painting process. Each selected individual tool pan 121 attaches to the stanchion structure 103. The stanchion structure 103 elevates each selected individual tool pan 121 above the pedestal pan 101.

The elevation of each selected individual tool pan 121 above the pedestal pan 101 is adjustable. By adjustable is meant that the difference in elevation between any first individual tool pan 121 selected from the plurality of tool pans 102 and any second individual tool pan 121 selected from the plurality of tool pans 102 is adjustable. By adjustable is further meant that the difference in elevation between any first individual tool pan 121 selected from the plurality of tool pans 102 and the superior tool pan 122 is adjustable.

The individual tool pans 121 further comprises a plurality of individual extension pole 104 apertures 161.

Each individual extension pole 104 aperture selected from the plurality of individual extension pole 104 apertures 161 is a negative space that is formed through the inferior closed face of the pan structure of the individual tool pan 121 selected from the plurality of tool pans 102 that is associated with the plurality of individual extension pole 104 apertures 161. Each individual extension pole 104 aperture selected from the plurality of individual extension pole 104 apertures 161 is sized such that an extension pole 104 inserts through the selected individual extension pole 104 aperture.

Any first individual extension pole 104 aperture selected from a first plurality of individual extension pole 104 apertures 161 that is associated with a first individual tool pan 121 aligns with a second individual extension pole 104 aperture selected from a second plurality of individual extension pole 104 apertures 161 that is associated with a second individual tool pan 121. The first selected individual extension pole 104 aperture aligns with the second selected individual extension pole 104 aperture such that the extension pole 104 will simultaneously insert through the first selected individual extension pole 104 aperture and the second selected individual extension pole 104 aperture. The plurality of individual extension pole 104 apertures 161 associated with any first selected individual tool pan 121 aligns with the plurality of individual extension pole 104 apertures 161 associated with any second selected individual tool pan 121 such that the extension pole 104 will insert through the plurality of tool pans 102 and come to rest on the primary pan 111.

One individual tool pan 121 selected from the plurality of tool pans 102 is designated as a superior tool pan 122. The superior tool pan 122 is a prism shaped structure. The superior tool pan 122 is a disk shaped structure. The congruent ends of the disk shaped structure of The superior tool pan 122 are horizontally oriented. The superior tool pan 122 has a pan shape. The superior tool pan 122 forms the superior structure attached to the stanchion structure 103. The superior tool pan 122 contains the tools required for the painting process. The superior tool pan 122 further comprises a handle 123, a ladder hook 124, and a plurality of superior extension pole 104 apertures 162.

The handle 123 is a grip that attaches to the lateral face of the disk structure of the superior tool pan 122. The handle 123 is used to push and control the invention 100 into position. The ladder hook 124 is a fastening device. The ladder hook 124 is configured for use with a step ladder. The ladder hook 124 suspends the step ladder above the supporting surface.

Each individual extension pole 104 aperture selected from the plurality of superior extension pole 104 apertures 162 is a negative space that is formed through the inferior closed face of the pan structure of the superior tool pan 122. Each individual extension pole 104 aperture selected from the plurality of superior extension pole 104 apertures 162 is sized such that an extension pole 104 inserts through the selected individual extension pole 104 aperture. Any superior extension pole 104 aperture selected from the plurality of superior extension pole 104 apertures 162 aligns with a second individual extension pole 104 aperture selected from a plurality of individual extension pole 104 apertures 161 that is associated with an individual tool pan 121. The selected superior extension pole 104 aperture aligns with the selected individual extension pole 104 aperture such that the extension pole 104 will simultaneously inserts through the superior extension pole 104 aperture and the selected individual extension pole 104 aperture.

The extension pole 104 is a pole. The extension pole 104 is a prism shaped structure. The extension pole 104 forms an extension structure. The extension pole 104 extends the reach between a tool used for painting and a painter using the tool.

The stanchion structure 103 is a load bearing structure. The stanchion structure 103 is a vertically oriented structure. The stanchion structure 103 mounts on the pedestal pan 101 such that the stanchion structure 103 projects away from the pedestal pan 101 in the superior direction. Each individual tool pan 121 selected from the plurality of tool pans 102 attaches to the stanchion structure 103. The superior tool pan 122 attaches to the stanchion structure 103. The elevation of each selected individual tool pan 121 adjusts by adjusting the attachment position of the selected individual tool pan 121 to the stanchion structure 103. The superior tool pan 122 attaches to the superior structures of the stanchion structure 103. The stanchion structure 103 transfers the loads of the plurality of tool pans 102, including the superior tool pan 122, to the supporting surface. The stanchion structure 103 comprises a first stanchion 131, a second stanchion 132, and a five gallon brace 133.

The first stanchion 131 is a rigid structure. The first stanchion 131 is a prism shaped structure. The first stanchion 131 is a vertically oriented structure. The first stanchion 131 attaches to the primary pan 111 of the pedestal pan 101 such that the center axis of the prism structure of the first stanchion 131 projects perpendicularly away from the inferior congruent end of the primary pan 111. The first stanchion 131 is a load bearing structure. The first stanchion 131 transfers a portion of the loads of the plurality of tool pans 102, including the superior tool pan 122, to the primary pan 111. Each individual tool pan 121 selected from the plurality of tool pans 102 removably attaches to the first stanchion 131 such that the elevation of the selected individual tool pan 121 is adjustable. The superior tool pan 122 attaches to the superior congruent end of the prism structure of the first stanchion 131.

The second stanchion 132 is a rigid structure. The second stanchion 132 is a prism shaped structure. The second stanchion 132 is a vertically oriented structure. The second stanchion 132 is identical to the first stanchion 131. The second stanchion 132 attaches to the primary pan 111 of the pedestal pan 101 such that the center axis of the prism structure of the second stanchion 132 projects perpendicularly away from the inferior congruent end of the primary pan 111. The second stanchion 132 is a load bearing structure. The second stanchion 132 transfers a portion of the loads of the plurality of tool pans 102, including the superior tool pan 122, to the primary pan 111. Each individual tool pan 121 selected from the plurality of tool pans 102 removably attaches to the second stanchion 132 such that the elevation of the selected individual tool pan 121 is adjustable. The superior tool pan 122 attaches to the superior congruent end of the prism structure of the second stanchion 132.

The five gallon brace 133 is a mechanical structure. The five gallon brace 133 attaches to the first stanchion 131. The five gallon brace 133 attaches to the second stanchion 132. The five gallon brace 133 is adapted to fit around a five gallon can of paint. The five gallon brace 133 is aligned with the five gallon paint pan 151. The five gallon brace 133 fits around a five gallon paint can that is inserted into the five gallon paint pan 151. The five gallon brace 133 stabilizes the five gallon paint can during the movement of the invention 100.

The following definitions were used in this disclosure:

Adjustable: As used in this disclosure, the term adjustable refers to the ability of a structure or device to change its fit (or form factor), appearance, input requirements, or its output to meet the needs of a situation.

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Brace: As used in this disclosure, a brace is a structural element that is used to support, stabilize, or otherwise steady an object.

Cant: As used in this disclosure, a cant is an angular deviation from one or more reference lines (or planes) such as a vertical line (or plane) or a horizontal line (or plane).

Cart: As used in this disclosure, a cart is small vehicle intended to be moved by a person. A synonym for cart is hand cart.

Caster: As used in this disclosure, a caster is a wheel that is mounted on a swivel that allows the wheel to adjust, or swivel, the direction of rotation of the wheel to the direction of motion desired for the wheel. The generic parts of a caster are called the stem, the swivel bearing, the swivel mount and the wheel. The swivel bearing attaches the stem to the swivel mount such that the swivel mount will rotate relative to the stem. The wheel attaches to the swivel mount such that the wheel freely rotates relative to the swivel mount. The direction of the axis of rotation of the wheel is perpendicular to the direction of the axis of rotation of the swivel mount. The stem attaches the swivel bearing, the swivel mount, and the wheel to an externally provided object.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Extension Structure: As used in this disclosure, an extension structure is an inert physical structure that is used to extend or bridge the reach between any two objects.

Exterior: As used in this disclosure, the exterior is used as a relational term that implies that an object is not contained within the boundary of a structure or a space.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Grip: As used in this disclosure, a grip is an accommodation formed on or within an object that allows the object to be grasped or manipulated by a hand.

Ground: As used in this disclosure, the ground is a solid supporting surface formed by the Earth. The term level ground means that the supporting surface formed by the ground is roughly perpendicular to the force of gravity. The term underground refers to an object being underneath the superior surface of the ground.

Handle: As used in this disclosure, a handle is an object by which a tool, object, or door is held or manipulated with the hand.

Hook: As used in this disclosure, a hook is an object that is curved or bent at an angle such that items can be hung on or caught by the object.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inferior: As used in this disclosure, the term inferior refers to a directional reference that is parallel to and in the same direction as the force of gravity when an object is positioned or used normally.

Interior: As used in this disclosure, the interior is used as a relational term that implies that an object is contained within the boundary of a structure or a space.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Negative Space: As used in this disclosure, negative space is a method of defining an object through the use of open or empty space as the definition of the object itself, or, through the use of open or empty space to describe the boundaries of an object.

Not Significantly Different: As used in this disclosure, the term not significantly different compares a specified property of a first object to the corresponding property of a reference object (reference property). The specified property is considered to be not significantly different from the reference property when the absolute value of the difference between the specified property and the reference property is less than 10.0% of the reference property value. A negligible difference is considered to be not significantly different.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan are open.

Pedestal: As used in this disclosure, a pedestal is an intermediary load bearing structure that forms a load path between two objects or structures.

Perimeter: As used in this disclosure, a perimeter is one or more curved or straight lines that bounds an enclosed area on a plane or surface. The perimeter of a circle is commonly referred to as a circumference.

Pole: As used in this disclosure, a pole is a prism shaped extension structure that extends the reach between: a) two objects; or, b) a person and an object.

Primary Shape: As used in this disclosure, the primary shape refers to a description of the rough overall geometric shape of an object that is assembled from multiple components or surfaces.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Reach: As used in this disclosure, reach refers to a span of distance between any two objects.

Rigid Structure: As used in this disclosure, a rigid structure is a solid structure formed from an inelastic material that resists changes in shape. A rigid structure will permanently deform as it fails under a force. See bimodal flexible structure.

Rotation: As used in this disclosure, rotation refers to the cyclic movement of an object around a fixed point or fixed axis. The verb of rotation is to rotate.

Roughly: As used in this disclosure, roughly refers to a comparison between two objects. Roughly means that the difference between one or more parameters of the two compared objects are not significantly different.

Stanchion: As used in this disclosure, a stanchion refers to a vertically oriented prism-shaped pole, post, or support.

Stepladder: As used in this disclosure, a stepladder is a self-standing climbing structure. The stepladder is formed from rails and rungs used by an individual to change their elevation. The rails are joined by the rungs. The rungs are mounted horizontally. The rails provide the vertical support for the ladder. The rungs form the step structures used to change elevation. The superior structure of a stepladder is called the top cap. The folding gussets commonly used to stabilize the rails of a stepladder are called the spreaders.

Suspend: As used in this disclosure, to suspend an object means to support an object such that the inferior end of the object does not form a significant portion of the load path of the object. Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

Swivel: As used in this disclosure, a swivel is a fastening structure that attaches a first object to a second object such that will rotate around an axis of rotation while the second object remains in a fixed position relative to the first object.

Tool: As used in this disclosure, a tool is a device, an apparatus, or an instrument that is used to carry out an activity, operation, or procedure. A tool generally comprises a working element and a handle.

Vehicle: As used in this disclosure, a vehicle is a device that is used for transporting passengers, goods, or equipment. The term motorized vehicle specifically refers to a vehicle can move under power provided by an electric motor or an internal combustion engine. The term vehicle generically applies to motorized vehicles and vehicles without a motor. A motorized vehicle further comprises an electrical system that can be used as a source of electric energy. The enclosed passenger space of a vehicle is known as a cab.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Wheel: As used in this disclosure, a wheel is a circular object that revolves around an axle or an axis and is fixed below an object to enable it to move easily over the ground. For the purpose of this disclosure, it is assumed that a wheel can only revolve in a forward and a backward direction. Wheels are often further defined with a rim and spokes. Spokes are also commonly referred to as a wheel disk.

Working Element: As used in this disclosure, the working element of a tool is the physical element on the tool that performs the actual activity, operation, or procedure the tool is designed to perform. For example, the cutting edge of a blade is the working element of a knife.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A paint cart comprising a pedestal pan, a plurality of tool pans, and a stanchion structure; wherein the stanchion structure elevates each individual tool pan selected from the plurality of tool pans above the pedestal pan; wherein the stanchion structure comprises a first stanchion, a second stanchion, and a five gallon brace; wherein the five gallon brace is adapted to stabilize a five gallon paint can during the movement of the paint cart; wherein each individual tool pan further comprises a plurality of individual extension pole apertures; wherein each individual extension pole aperture selected from the plurality of individual extension pole apertures is sized such that an extension pole inserts through the selected individual extension pole aperture;

wherein a primary pan forms the primary shape of the pedestal pan;

wherein congruent ends of the primary pan are horizontally oriented; wherein the primary pan has a pan shape; wherein the closed face of the pan structure of the primary pan forms the inferior surface of the pan shape of the primary pan; wherein the stanchion structure attaches to the primary pan;

wherein the primary pan is a load bearing structure; wherein the primary pan transfers the load of the stanchion structure to a plurality of casters; wherein the primary pan forms the structure that stores paint used in the painting process;

wherein each individual extension pole aperture selected from the plurality of individual extension pole apertures is a negative space that is formed through the inferior closed face of the pan structure of the individual tool pan selected from the plurality of tool pans that is associated with the plurality of individual extension pole apertures;

wherein any first individual extension pole aperture selected from a first plurality of individual extension pole apertures that is associated with a first individual tool pan aligns with a second individual extension pole aperture selected from a second plurality of individual extension pole apertures that is associated with a second individual tool pan; wherein the first selected individual extension pole aperture aligns with the second selected individual extension pole aperture such that the extension pole will simultaneously insert through the first selected individual extension pole aperture and the second selected individual extension pole aperture; wherein the plurality of individual extension pole apertures associated with any first selected individual tool pan aligns with the plurality of individual extension pole apertures associated with any second selected individual tool pan such that the extension pole will insert through the plurality of tool pans and come to rest on the primary pan.

2. The paint cart according to claim 1
wherein the paint cart is adapted for use with painting equipment and supplies;
wherein the paint cart stores the painting equipment and supplies;
wherein the paint cart transports the painting equipment and supplies over a supporting surface.

3. The paint cart according to claim 2
wherein congruent ends of the the pedestal pan are horizontally oriented;
wherein the pedestal pan has a pan shape;
wherein the pedestal pan forms the inferior structure of the paint cart;
wherein the pedestal pan is a load bearing structure;
wherein the pedestal pan transfers the load of the stanchion structure to a supporting surface;
wherein the pedestal pan contains the stocks of paint required for the painting process.

4. The paint cart according to claim 3,
wherein each selected individual tool pan attaches to the stanchion structure;
wherein the stanchion structure elevates each selected individual tool pan above the pedestal pan;
wherein the elevation of each selected individual tool pan above the pedestal pan is adjustable;
wherein by adjustable is meant that the difference in elevation between any first individual tool pan selected from the plurality of tool pans and any second individual tool pan selected from the plurality of tool pans is adjustable;
wherein by adjustable is further meant that the difference in elevation between any first individual tool pan selected from the plurality of tool pans and a superior tool pan is adjustable.

5. The paint cart according to claim 4
wherein the stanchion structure is a load bearing structure;
wherein the stanchion structure is a vertically oriented structure;
wherein the stanchion structure mounts on the pedestal pan such that the stanchion structure projects away from the pedestal pan in the superior direction;
wherein each individual tool pan selected from the plurality of tool pans attaches to the stanchion structure;
wherein the superior tool pan attaches to the stanchion structure;
wherein the elevation of each selected individual tool pan adjusts by adjusting the attachment position of the selected individual tool pan to the stanchion structure;
wherein the superior tool pan attaches to the superior structures of the stanchion structure;
wherein the stanchion structure transfers the loads of the plurality of tool pans, including the superior tool pan, to the supporting surface.

6. The paint cart according to claim 5
wherein the pedestal pan comprises the primary pan and a plurality of anchor pans;
wherein the plurality of anchor pans mount in the primary pan.

7. The paint cart according to claim 6
wherein the five gallon brace attaches to the first stanchion and the second stanchion.

8. The paint cart according to claim 7
wherein the primary pan further comprises the plurality of casters;
wherein the plurality of casters forms the inferior structure of the paint cart;
wherein the plurality of casters transfers the load borne by the primary pan to the supporting surface;
wherein the plurality of casters attaches to the inferior surface of the closed face of the pan structure of the primary pan;
wherein each caster selected from the plurality of casters is a rolling structure;

wherein each selected caster transfers a portion of the load of the primary pan to the supporting surface;

wherein the plurality of casters rolls the paint cart over the supporting surface.

9. The paint cart according to claim 8 wherein the congruent ends of each anchor pan selected from the plurality of anchor pans are horizontally oriented;

wherein each anchor pan selected from the plurality of anchor pans has a pan shape;

wherein the closed face of each selected anchor pan is formed by the closed face of the pan structure of the primary pan;

wherein each selected anchor pan is geometrically similar to a can of paint;

wherein each selected anchor pan is sized such that the can of paint inserts into the selected anchor pan for storage;

wherein each selected anchor pan stores the can of paint during transport;

wherein each selected anchor pan prevents the can of paint from shifting during transport.

10. The paint cart according to claim 9 wherein the plurality of anchor pans further comprises a five gallon paint pan and a plurality of one gallon paint pans;

wherein the five gallon paint pan is a pan that is formed on the superior surface of the closed face of the primary pan;

wherein the five gallon paint pan is geometrically similar to the five gallon paint can;

wherein the five gallon paint pan is sized such that the five gallon paint can fits in the five gallon paint pan;

wherein the five gallon paint pan anchors the five gallon can to the primary pan while the paint cart is in motion;

wherein each one gallon paint pan selected from the plurality of one gallon paint pans is a pan that is formed on the superior surface of the closed face of the primary pan;

wherein the plurality of one gallon paint pans is geometrically similar to a one gallon paint can;

wherein the plurality of one gallon paint pans is sized such that the one gallon paint can fits in the plurality of one gallon paint pans;

wherein the plurality of one gallon paint pans anchors the one gallon can to the primary pan while the paint cart is in motion.

11. The paint cart according to claim 10 wherein the plurality of tool pans comprises a collection of individual tool pans;

wherein the congruent ends of each selected individual tool pan are horizontally oriented;

wherein each selected individual tool pan has a pan shape;

wherein each selected individual tool pan contains the tools required for the painting process.

12. The paint cart according to claim 11, wherein one individual tool pan selected from the plurality of tool pans is designated as the superior tool pan;

wherein the congruent ends of the superior tool pan are horizontally oriented;

wherein the superior tool pan has a pan shape;

wherein the superior tool pan forms the superior structure attached to the stanchion structure;

wherein the superior tool pan contains the tools required for the painting process.

13. The paint cart according to claim 12 wherein the superior tool pan further comprises a plurality of superior extension pole apertures;

wherein each individual extension pole aperture selected from the plurality of superior extension pole apertures is a negative space that is formed through the inferior closed face of the pan structure of the superior tool pan;

wherein each individual extension pole aperture selected from the plurality of superior extension pole apertures is sized such that an extension pole inserts through the selected individual extension pole aperture;

wherein any superior extension pole aperture selected from the plurality of superior extension pole apertures aligns with a second individual extension pole aperture selected from a plurality of individual extension pole apertures that is associated with an individual tool pan;

wherein the selected superior extension pole aperture aligns with the selected individual extension pole aperture such that the extension pole will simultaneously inserts through the superior extension pole aperture and the selected individual extension pole aperture.

14. The paint cart according to claim 13 wherein the first stanchion is a rigid structure;

wherein the first stanchion is a prism shaped structure;

wherein the first stanchion is a vertically oriented structure;

wherein the first stanchion attaches to the primary pan of the pedestal pan such that the center axis of the prism structure of the first stanchion projects perpendicularly away from the inferior congruent end of the primary pan;

wherein the first stanchion is a load bearing structure;

wherein the first stanchion transfers a portion of the loads of the plurality of tool pans, including the superior tool pan, to the primary pan;

wherein each individual tool pan selected from the plurality of tool pans removably attaches to the first stanchion such that the elevation of the selected individual tool pan is adjustable;

wherein the superior tool pan attaches to the superior congruent end of the prism structure of the first stanchion;

wherein the second stanchion is a rigid structure;

wherein the second stanchion is a prism shaped structure;

wherein the second stanchion is a vertically oriented structure;

wherein the second stanchion is identical to the first stanchion;

wherein the second stanchion attaches to the primary pan of the pedestal pan such that the center axis of the prism structure of the second stanchion projects perpendicularly away from the inferior congruent end of the primary pan;

wherein the second stanchion is a load bearing structure;

wherein the second stanchion transfers a portion of the loads of the plurality of tool pans, including the superior tool pan, to the primary pan;

wherein each individual tool pan selected from the plurality of tool pans removably attaches to the second stanchion such that the elevation of the selected individual tool pan is adjustable;

wherein the superior tool pan attaches to the superior congruent end of the prism structure of the second stanchion.

15. The paint cart according to claim 14
wherein the five gallon brace is a mechanical structure;
wherein the five gallon brace attaches to the first stanchion;
wherein the five gallon brace attaches to the second stanchion;
wherein the five gallon brace is adapted to fit around the five gallon can of paint;
wherein the five gallon brace is aligned with the five gallon paint pan;
wherein the five gallon brace fits around a five gallon paint can that is inserted into the five gallon paint pan.

* * * * *